United States Patent [19]

Kim

[11] Patent Number: 4,978,083
[45] Date of Patent: Dec. 18, 1990

[54] REEL HOLDER FOR RETAINING REELS OF VIDEO FILM

[75] Inventor: Jae Hwan Kim, Chungchongnam, Rep. of Korea

[73] Assignee: SKC Limited, Kyongki, Rep. of Korea

[21] Appl. No.: 277,563

[22] Filed: Nov. 29, 1988

[30] Foreign Application Priority Data

Jan. 25, 1988 [KR] Rep. of Korea .................. 88-575

[51] Int. Cl.⁵ .................................................. B65H 75/18
[52] U.S. Cl. .................................. 242/56.9; 242/72 R
[58] Field of Search .................. 242/56.9, 68.5, 72 R, 242/67.1 R, 67.3, 67.2, 56 R

[56] References Cited

U.S. PATENT DOCUMENTS

| | | | |
|---|---|---|---|
| 4,133,491 | 1/1979 | Yamazaki et al. | 242/56.9 |
| 4,139,165 | 2/1979 | Dyck | 242/56.9 |
| 4,438,888 | 3/1984 | Seelinger | 242/56.9 |
| 4,854,518 | 8/1989 | Yamazaki et al. | 242/56.9 |

Primary Examiner—Stuart S. Levy
Assistant Examiner—Steven M. duBois
Attorney, Agent, or Firm—Ladas & Parry

[57] ABSTRACT

A flangeless-type reel holder for a device manufacturing reels of video film including a ring-type leaf spring fitted around the reel holder. The reel holder is fitted around a sleeve mounted on a drive shaft of the device, by means of a bearing interposed therebetween. The reel holder is directly coupled to the outer rim of the bearing. The outer diameter of the leaf spring fitted around the reel holder is larger than that of an annular rim of the reel holder so that the inner peripheral surface of a reel hub to be fitted around the reel holder can closely contact with the outer surface of the leaf spring.

7 Claims, 2 Drawing Sheets

REEL HOLDER FOR RETAINING REELS OF VIDEO FILM

BACKGROUND OF THE INVENTION

The present invention relates to a device for manufacturing reels of video film, and particularly to a reel holder for a device manufacturing reels of video film by winding video tapes having a certain width on reel hubs. The reel holder supports the reel hubs and drives them by a constant torque transmitted from a drive shaft of the winding device. In particular, the present invention relates to a flangeless-type reel holder wherein a ring-type leaf spring is fitted around the said reel holder in order to provide easy mounting and separation of reel hubs, and the outer rim of a bearing interposed between the said holder and the sleeve which is directly coupled to the holder.

Reels of video film are mainly used as a supply of tapes to be wound on reels of video cassettes. In manufacturing reels of video film, tapes are spliced from a tape by a cutting process and are wound around reel hubs R and coupled to reel holders H and are mounted on drive shafts S of the winding device, thus, several (about 20) reels of video film are manufactured at a time.

Each reel holder is supported by a bearing interposed between its holder body and a sleeve mounted on a drive shaft which drives therewith. The reel holder has an air brake which is adapted to drive the reel holder by a constant torque transmitted from the drive shaft by pressurized air. The outer portion of the reel holder has a support construction enabling the mounting and separation of the reel hub.

As shown in FIGS. 3 and 4, such conventional reel holders include a flange 2 having the diameter larger than the outer diameter of the reel holder 1. The flange 2 is formed at one peripheral edge of the reel holder 1, and adapted to support one side of a reel hub 3. The other side of the reel hub 3 is supported by a coil spring 5 disposed in an annular groove 4 formed between the reel holder 1 and a holder cover 8. The coil spring 5 has three portions slightly protruding from the peripheral surface of the reel holder 1 accordingly, the coil spring 5 supports the reel hub at three protruded portions thereof. In the case of handling several flange-type reel holders, the reel holders have to be manually fitted around the drive shaft, one by one. The produced reels of video film also have to be removed from the drive shaft, one by one consquently, the reel holders are frequently damaged, thereby causing them to be prematurely. Due to the unstable support of the coil spring which supports the reel hub only at three portions thereof, the reel hub may be shaken so that the wound tape may escape from the reel hub, causing it to be damaged. The outer rim of the bearing 7 interposed between the holder 1 and the sleeve 6 is supported by a bearing boss 8' extended from a holder cover 8 which is fixed to the side of the holder by means of a screw. Due to the damage caused by the repeated driving and stopping of the holder, the screw may be released or the bearing boss 8' may be broken.

The above-mentioned disadvantage of conventional reel holders will be overcome by providing a flangeless reel holder. This flangeless reel holder enables automatic mounting and removing of the holder by use of a robot.

SUMMARY OF THE INVENTION

Therefore, the object of the present invention is to provide an improved construction of a reel holder which enables the use of a robot, so that the rapid working and the reduced production cost can be obtained.

The other object of the present invention is to provide an improved construction of a reel holder which prevents shaking of the reel hub, thereby causing the production of poor reels of video film to be minimized and thus the damage of tapes to be previously avoided.

In accordance with the present invention, these objects can be accomplished by providing a device for manufacturing reels of video film comprising a drive shaft; several sleeves fixedly mounted on said drive shaft; several reel holders each mounted on corresponding sleeves by means of a bearing interposed between them; several air brake means disposed in each of said reel holders; several holder covers each fixed on one side of each reel holder by means of screws; each of said reel holders being adapted to support a reel hub thereon; the device being characterized in each of said reel holders is directly coupled to the outer rim of said bearing; that the reel holder has an annular rim at the peripheral edge thereof disposed opposite to said holder cover; that an annular recess is defined between said annular rim and the holder cover; that a ring-type leaf spring and a rubber pad are fitted around said recess; and that the outer diameter of said leaf spring fitted around the recess is larger than that of said annular rim of the reel holder or that of said holder cover so that the inner peripheral surface of each reel hub can closely contact with said outer surface of said leaf spring.

DETAILED DESCRIPTION OF THE PREFERRED EMBODIMENTS

Figure 1:
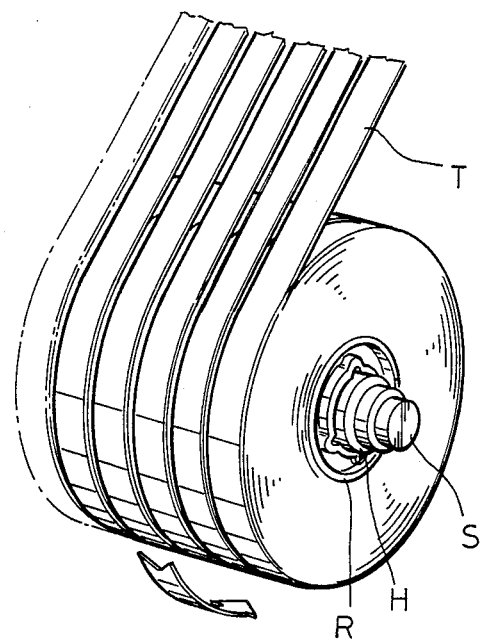
FIG. 1 is a schematic perspective view showing a work for winding reels of video film.
Figure 2:
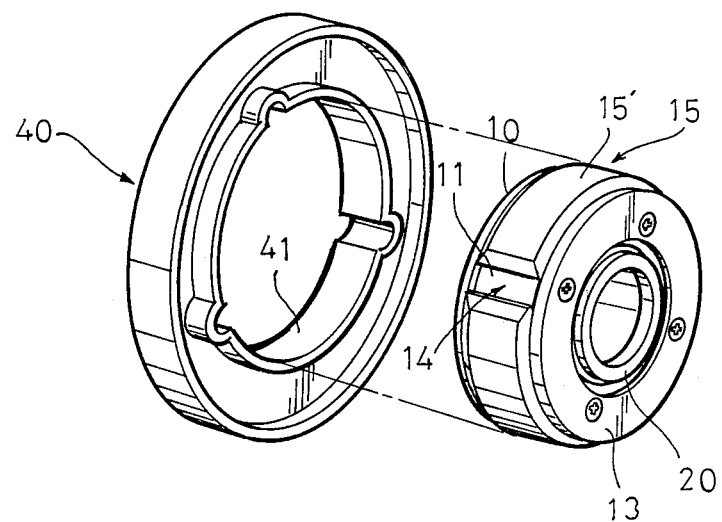
FIG. 2 is an expanded perspective view of a reel holder and a reel hub in accordance with the present invention.
Figure 3A:
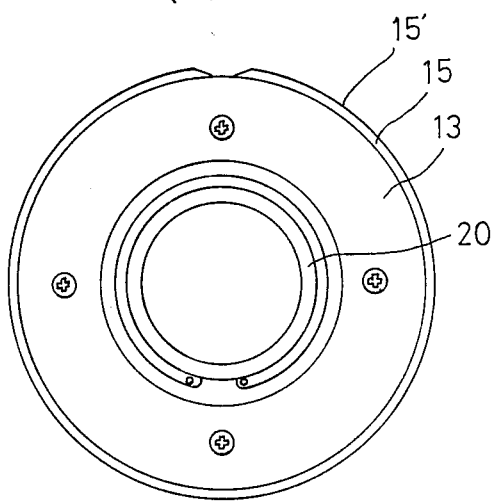
FIG. 3a is a front view of a reel holder of the present invention.
Figure 3B:
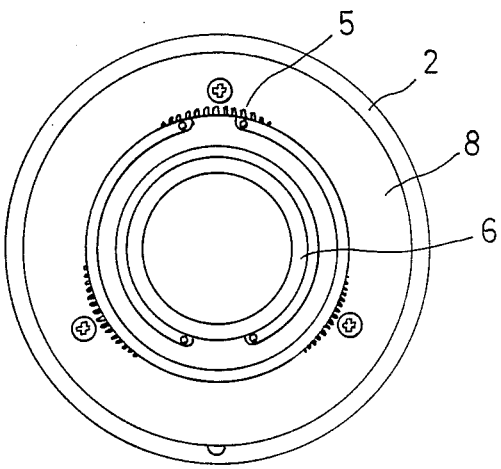
FIG. 3b is a front view of a conventional reel holder.
Figure 4:
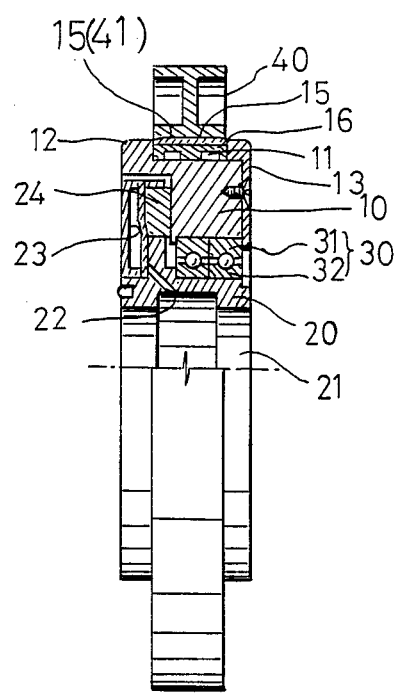
FIG. 4a is a partial sectional view of a reel holder of the present invention.
FIG. 4b is a partial sectional view of a conventional reel holder.
Figure 4:
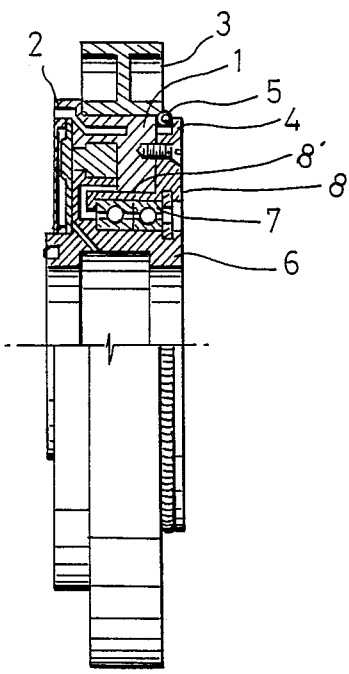
Figure 4:
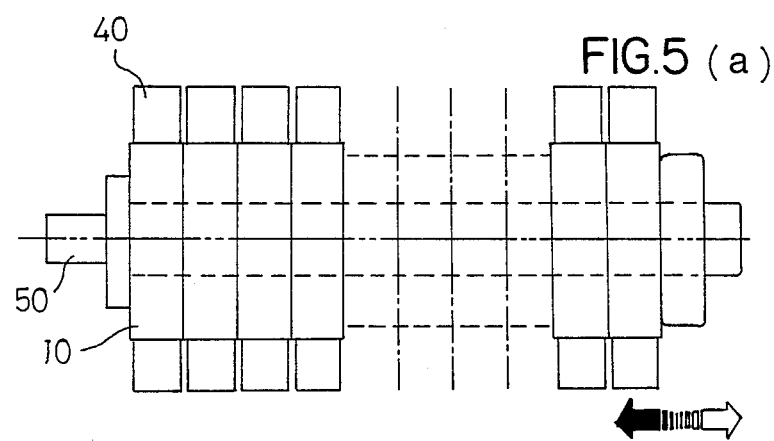

Referring to FIGS. 2 and 3a, there is shown a reel holder 10 in accordance with the present invention. The reel holder 10 is coupled to an inner sleeve 20 mounted to a drive shaft. A bearing 30 is interposed between the reel holder 10 and the sleeve 20. The outer rim 31 of the bearing 30 is directly coupled to the reel holder 10 and the inner rim 32 of the bearing 30 is directly coupled to the sleeve 20. Thus, the reel holder 10 and the sleeve 20 rotate relative to each other.

The reel holder 10 has an annular rim at one edge of the peripheral surface 11. On the other side of the reel holder 10, a holder cover 13 is fixed by means of screws. The holder cover 13 supports one side of the bearing 30 at the inner peripheral edge and covers a portion of the peripheral edge and covers a portion of the peripheral surface 11 at the outer peripheral edge. The outer peripheral edge of the holder cover 13 defines an annular recess 14, together with the annular rim 12. In the recess 14, a ring-type leaf spring 15 and a rubber pad having a ridge and valleys are disposed. The ring-type leaf spring 15 has strong elasticity when the leaf spring 15 is fitted around the reel holder 10, the outer diameter thereof at the outer peripheral surface 15' is larger than that of the annular rim 12 or that of the holder cover 13. Thereby, when the reel hub 40 is fitted around the reel holder 10, the inner peripheral surface 41 of the reel hub 40 can closely contact with the reel holder 10.

The rubber pad 16 interposed between the leaf spring 15 and the peripheral surface 11 of the reel holder 10 prevents an occasional rotation of the leaf spring 15 and strengthens the elasticity of the leaf spring 15.

The sleeve 20 has a hollow portion 21 into which a drive shaft 50 is inserted, the sleeve 20 is mounted on the drive shaft 50 in order to rotate. The sleeve 20 also includes a conventional air brake means comprising an inlet 22 of pressurized air communicating with a pressurized air supply, a diaphragm 23, and a piston 24.

The function of the reel holder in accordance with the present invention will be described.

When pressurized air comes into the inlet 22 of the sleeve 20, as the sleeve 20 rotates by the drive shaft 50, the diaphragm 23 expands and the surface of the diaphragm 23 closely contacts with the reel holder 10. Accordingly, the reel holder 10 rotates together with the sleeve 20. Thus, the winding of tapes is initiated. If overload is larger than the frictional force of the diaphragm 23 generated by the pressurized air, a slip is generated, thereby causing the holder 10 not to rotate. As a result, The elongation of tape due to the overload can be prevented. This operation is conventionally carried out.

In accordance with the present invention, the outer rim 31 of the bearing 30 is directly coupled to the reel holder 10. Accordingly, there is no risk of the release or the damage of the holder cover 13 fixed to the reel holder 10 by means of screws, even when a damage is generated at the initiating point of driving the reel holder 10 by the air brake and the initiating point of the slip caused by the release of braking.

The inner surface 41 of the reel hub 40 closely contacts with the outer surface 15' of the leaf spring 15 fitted around the recess 14 on the peripheral surface 11 of the reel holder 10. In accordance with the present invention, the shaking of the reel hub 40 is hardly generated. As a result, the wound condition of tapes T on the outer peripheral surface of the reel hub 40 is uniform and the condition of the edges of the wound tapes is clean. Furthermore, the damage of tapes is prevented in during handling.

Figure 5:
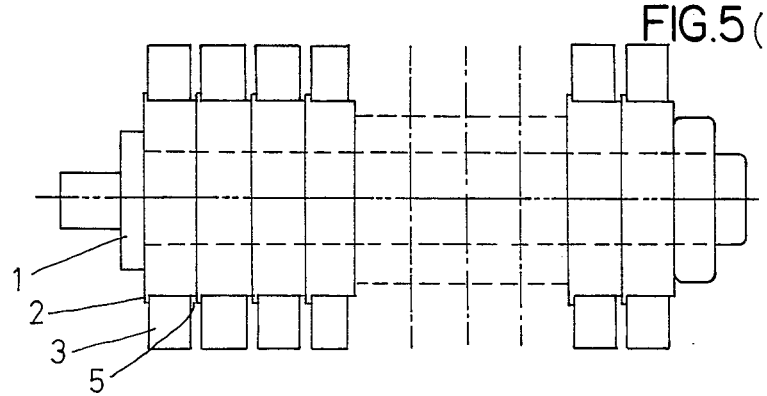
FIG. 5a is a schematic elevation view showing the using condition of a reel holder of the present invention.
FIG. 5b is a schematic elevation view showing the using condition of a conventional reel holder.

When several reel holders are mounted on a single drive shaft 50 in order to wind tapes thereon, as shown in FIG. 5a, access of reel holders to the drive shaft is freely achieved from every side of the drive shaft.

Accordingly, the mounting of reel hubs on the drive shaft can be carried out only by fitting the reel hubs around the reel holders one by one in order to support each reel hub on the outer peripheral surface of the corresponding reel holder, and thus on the surface 15' of its leaf spring 15, without the separation of the reel holders from the drive shaft 50. When the produced reels of video film have to be removed, the separation of the reel holders from the drive shaft is also unnecessary. As a result, all pancakes can simply be removed one at a time by a robot.

As apparent from the above description, the reel holders of the present invention eliminate the wear of reel holder due to the damage, since the separation of reel holders from the drive shaft is unnecessary. Weak parts which are likely to be broken due to an instantaneous damage generated by a repeated driving and stopping are eliminated, thereby causing the life of the reel holder to be lengthened.

The flangeless-type reel holder of the present invention enables automation of the manufacture of reels of video film, in of an easy mounting and separation of reel hubs. Thereby, the rapid working and the reduced production cost can be obtained. Furthermore, the production of poor reels of video film can be minimized and the damage of tapes can be previously avoided.

What is claimed is:

1. A device for use in manufacturing reels of video film comprising:
    a drive shaft;
    a plurality of sleeves fixedly mounted on said drive shaft;
    a plurality of reel holders each mounted on a corresponding sleeve, each reel holder having an annular rim;
    bearing means interposed between said reel holders and said corresponding sleeves;
    brake means disposed in each of said sleeves and adjacent to a corresponding reel holder of said sleeve;
    a holder cover fixed on each reel holder on a side opposite said annular rim, said holder cover and said annular rim defining an annular recess therebetween, said annular rim and said holder cover having a diameter greater than a diameter of said annular recess;
    a rubber pad is fitted around each said annular recess;
    a leaf spring disposed around each said rubber pad, the leaf spring having an outer diameter greater than the diameter of said annular rim and said holder cover so that when a reel hub is fitted around said reel holder, said leaf spring tensilly urges against an inner peripheral surface of the reel hub thereby retaining the reel hub in a stable position.

2. A device for retaining a reel of video film, said device comprising:
    a reel holder having a peripheral surface, an annular rim and a holder cover opposite said annular rim, said annular rim and said holder cover having diameters greater than a diameter of said peripheral surface so that an annular recess is defined by said annular rim and said holder cover;
    a leaf spring disposed around said annular recess, the leaf spring having an outer diameter greater than the diameter of said annular rim and said holder cover so that when a reel hub is fitted around said reel holder, said leaf spring tensilly urges against an inner peripheral surface of the reel hub thereby retaining the reel hub in a stable position while also permitting easy removal of the reel hub from said reel holder.

3. A device as claimed in claim 2 further comprising a rubber pad fitted around said annular recess between said annular recess and said leaf spring;

4. A device as claimed in claim 3 further comprising:

a sleeve, said reel holder mounted on said sleeve, said sleeve having a hollow portion adapted for insertion of a drive shaft; and bearing means disposed between said sleeve and said reel holder, said bearing means having an outer rim being adjacent to said reel holder, said bearing means also having an inner rim being adjacent to said sleeve.

5. A device as claimed in claim 4 further comprising:

braking means disposed in said sleeve and adjacent to said reel holder.

6. A device as claimed in claim 5 wherein said braking means comprises:

an inlet;

a diaphragm; and a piston, so that when the sleeve is rotated, pressurized air enters said inlet causing said piston to frictionally urge said diaphragm against said reel holder so that reel holder rotates along with said sleeve, however when said reel holder sustains a predetermined load, the load overcomes said friction urged against said reel holder and said reel holder ceases to rotate relative to said sleeve.

7. A device for retaining a reel of video film, said device comprising:

a reel holder having a peripheral surface, an annular rim and a holder cover opposite said annular rim, said annular rim and said holder cover having diameters greater than a diameter of said peripheral surface so that an annular recess is defined by said annular rim and said holder cover;

a ring-type leaf spring disposed around said annular recess, the leaf spring having an outer diameter greater than the diameter of said annular rim and said holder cover so that when a reel hub is fitted around said reel holder, said leaf spring tensilly urges against an inner peripheral surface of the reel hub thereby retaining the reel hub in a stable position while also permitting easy removal of the reel hub from said reel holder;

a rubber pad fitted around said annular recess between said annular recess and said leaf spring;

a sleeve, said reel holder mounted on said sleeve, said sleeve having a hollow portion adapted for insertion of a drive shaft;

bearing means disposed between said sleeve and said reel holder, said bearing means having an outer rim being adjacent to said reel holder, said bearing means also having an inner rim being adjacent to said sleeve, and braking means disposed in said sleeve and adjacent to said reel holder, said braking means having an inlet; a diaphragm; and a piston, so that when the sleeve is rotated, pressurized air enters said inlet causing said piston to frictionally urge said diaphragm against said reel holder so that reel holder rotates along with said sleeve, however when said reel holder sustains a predetermined load, the load overcomes said friction urged against said reel holder and said reel holder ceases to rotate relative to said sleeve.

* * * * *